United States Patent [19]
Canivenc

[11] 3,747,115
[45] July 17, 1973

[54] CONNECTION SYSTEM FOR WAVES WITH VARIABLE POLARIZATION

[75] Inventor: Serge Canivenc, Perros-Guirec, France

[73] Assignee: Societe Lannionnaise D'Electronique, Lannion, France

[22] Filed: Sept. 14, 1971

[21] Appl. No.: 180,376

[52] U.S. Cl................ 343/820, 333/11, 343/853, 343/893, 343/756
[51] Int. Cl. ............................................. H01q 9/16
[58] Field of Search....................... 333/11; 343/756, 343/797, 853, 820, 854, 867, 893

[56] References Cited
UNITED STATES PATENTS

| | | | |
|---|---|---|---|
| 3,641,578 | 2/1972 | Spanos et al.......................... | 333/11 |
| 2,511,899 | 6/1950 | Brown............................ | 343/797 X |
| 3,460,144 | 8/1969 | Hannan.......................... | 343/853 X |
| 3,226,724 | 12/1965 | Brueckmann...................... | 343/853 |
| 3,004,153 | 10/1961 | Alford................................ | 343/853 |

Primary Examiner—Rudolph V. Rolinec
Assistant Examiner—Saxfield Chatmon, Jr.
Attorney—Craig, Antonelli & Hill

[57] ABSTRACT

An arrangement for combining the signal outputs from two antennas with crossed planes of polarization furnishes a constant output level regardless of the direction of rotation of the polarization of the incident wave. It is applicable particularly to the reception of signals from satellites.

4 Claims, 1 Drawing Figure

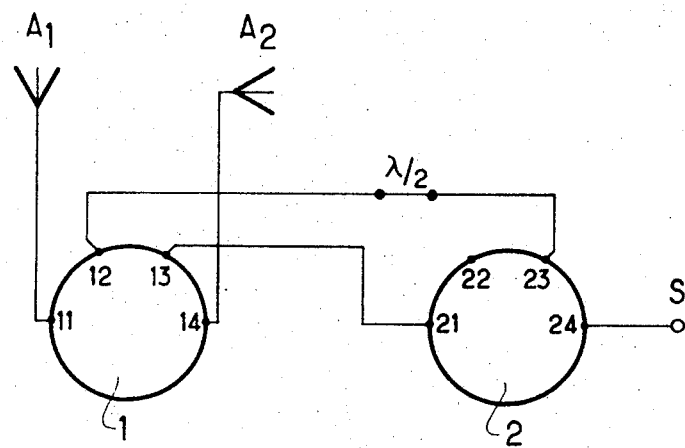

CONNECTION SYSTEM FOR WAVES WITH VARIABLE POLARIZATION

The present invention relates to the field of devices which combine the outputs from two antennas having crossed planes of polarization. It furnishes a constant output level irrespective of the direction of rotation of the polarization of the incident wave. It is applicable particularly to the reception of waves issued by satellites within the range of 1 to 30 MHz.

The signals originating from artificial satellites undergo, at the time of their passage through the ionosphere, a rotation of their plane of polarization due to the Faraday effect. The incident wave on the ground is thus affected by a circular polarization, which may be either right or left depending upon the direction of rotation of the polarization vector. The polarization of the wave received varies, however, periodically as a function of the site angle of the satellite.

In order to avoid during reception, the periodic attenuation of the signals due to the change in polarization, it is necessary that the antennas designed for receiving these signals operate equally for circularly polarized signals. This mode of operation is generally obtained by using two dipoles, or two levels of elements ( in the case of directional antennas ) arranged at 90° with respect to each other on a common axis, and dephasing about 90° one of the components of the incident wave in a manner such as to assure phase alignment with the other component, and then to carry out an addition of the two components. The passage from one mode of polarization to the other ( circular right mode to circular left mode, for example ) is then effected by means of a selective polarization system which allows for either including or not including in the lines connecting the antenna to the utilization of the lines having an electrical length of 90° by means of coaxial relays, which are manually controlled by the operator.

It is an object of the present invention to completely eliminate the commutation system by means of relays which forces the operator to continuously observe or monitor the level received and to manipulate, several times per orbit, the control of the polarization selector. The present invention further renders it possible to economize with respect to two coaxial relays the price of which is relatively high.

The single FIGURE of the accompanying drawing is a schematic diagram of the device according to the present invention.

The system proposed herein comprises two hybrid junctions of 6 λ / 4 in functional connection, numbered 1 and 2. The two antennas A1 and A2 at 90° are connected to the input points 11 and 14 of the hybrid junction 1. The two outputs are effected by way of the access points 12 and 13. These two access points are then connected by means of two coaxial lines to the access points 23 and 21 of the hybrid junction 2, the line 12-23 having a length greater by λ/2 than the line 13-21.

Let us assume that an incident wave is circularly polarized. The two components of the wave may be written as follows:

$$E11 = Eo \; \exp \; j \; \omega t$$
$$E14 = kEo \; \exp \; j \; (\omega t + \pi/2)$$

(1)

or $$E11 = kEo \; \exp \; j \; (\omega t + \pi/2)$$
$$E14 = Eo \; \exp \; j \; \omega t$$

(2)

$k$ being the ratio of the amplitudes of the two components. The case of $k = 1$ corresponds to the circular polarization, the case of $k \neq 1$ corresponds to the elliptic polarization. The equations (1) corresponds to right circular polarization; the equations (2) correspond to left circular polarization.

One may then write, neglecting the terms in $\exp j\omega t$, at the access points 12 and 13 of the hybrid junction 1:

a. in the case of the right circular polarization:
$$E12 = m \; Eo \; \exp \; j \pi/2. \; (1-k)$$
$$E13 = m \; Eo \; \text{Exp} \; j \pi. \; (1+k)$$
with $m = 1/\sqrt{2}$ b. in the case of the left circular polarization:
$$E12 = m \; Eo \; \exp \; j \pi. \; (1+k)$$
$$E13 = m \; Eo \; \exp \; j \pi/2. \; (1-k)$$

The voltages appearing at the access points 21 and 23 of the hybrid junction 2 for right circular polarization are equal to
$$E21 = m \; Eo \; \exp \; \pi. \; (1+k)$$
$$E23 = m \; Eo \; \exp \; 3\pi/2. \; (1-k)$$
and for left circular polarization:
$$E21 = m \; Eo \; \exp \; j \pi/2 \; . \; (1-k)$$
$$E23 = m \; Eo \; \exp \; j 2\pi. \; (1+k)$$

If the output S is effected at the port 24 of the hybrid junction 2, one will obtain for the two directions of circular polarization the same output voltage:
$$E23 = p. \; Eo \; \exp j 2\pi \; [(1-k) + \exp j\pi/2 \; (1+k)]$$
with $p = \frac{1}{2}$.

Consequently, irrespective of the mode of polarization, the voltage will be identical at the output S. In the case of the pure circular polarization ($k = 1$), one will have:

$$E24 = Eo \; \exp j \pi /2,$$
with the two modes of polarization.

I claim:

1. An apparatus for combining circularly polarized signals received from each of a pair of antennas having their planes of polarization perpendicular to each other and for providing a constant output level irrespective of the direction of rotation of polarization of the respective waves comprising:

first and second 6 λ /4 type circular hybrid junctions each having first, second, third and fourth respective access points, said antennas being respectively connected to said first and fourth access points of said first hybrid junction, while said second access point of said first hybrid junction is connected by a first line directly to said third access point of said second hybrid junction, said third access point of said first hybrid junction is connected by a second line directly to said first access point of said second hybrid junction and the output signal is taken from said fourth access point of said second hybrid junction, the lengths of said first and second lines differing by half the wavelength of the received signals.

2. An apparatus according to claim 1, wherein each of said hybrid junctions comprises a series connected hybrid ring.

3. An apparatus according to claim 1, wherein the length of the connection between said second access point of said first hybrid junction and said third access point of said second hybrid junction is one half wavelength greater than the length between the third access point of the first hybrid junction and the first access point of said second hybrid junction.

4. An apparatus according to claim 2, wherein the length of the connection between said second access point of said first hybrid junction and said third access point of said second hybrid junction is one half wavelength greater than the length between the third access point of the first hybrid junction and the first access point of said second hybrid junction.

* * * * *